United States Patent
Woo

(10) Patent No.: US 9,618,032 B2
(45) Date of Patent: Apr. 11, 2017

(54) VACUUM ABSORBER

(71) Applicant: MSINTECH CO., LTD., Seoul (KR)

(72) Inventor: Cheol-Seok Woo, Seoul (KR)

(73) Assignee: MSINTECH CO., LTD., Seoul (KR)

( * ) Notice: Subject to any disclaimer, the term of this patent is extended or adjusted under 35 U.S.C. 154(b) by 0 days.

(21) Appl. No.: 15/025,981

(22) PCT Filed: Mar. 19, 2013

(86) PCT No.: PCT/KR2013/002220
§ 371 (c)(1),
(2) Date: Mar. 30, 2016

(87) PCT Pub. No.: WO2014/148652
PCT Pub. Date: Sep. 25, 2014

(65) Prior Publication Data
US 2016/0238060 A1     Aug. 18, 2016

(51) Int. Cl.
*F16B 47/00*     (2006.01)

(52) U.S. Cl.
CPC .................. *F16B 47/003* (2013.01)

(58) Field of Classification Search
CPC ........ F16B 47/00; F16B 47/006; F16B 45/00; F16B 2001/0035; F16B 47/003
(Continued)

(56) References Cited

U.S. PATENT DOCUMENTS

| | | | | |
|---|---|---|---|---|
| 6,729,591 B2 * | 5/2004 | Hsu | ........................... | G09F 7/04 248/205.6 |
| 7,850,133 B2 * | 12/2010 | Carnevali | ............... | F16B 47/00 248/205.5 |

(Continued)

FOREIGN PATENT DOCUMENTS

| | | |
|---|---|---|
| KR | 1020070102293 A | 10/2007 |
| KR | 100967516 B1 | 7/2010 |

(Continued)

OTHER PUBLICATIONS

International Search Report for PCT/KR2013/002220 mailed Dec. 6, 2013.

*Primary Examiner* — Steven Marsh
(74) *Attorney, Agent, or Firm* — STIP Law Group, LLC

(57) ABSTRACT

The present invention relates to a vacuum absorber, wherein: the assembly of the respective components of the vacuum absorber can be improved and a smooth operation can be carried out; and the vacuum absorber can be firmly and easily attached to an attachment surface by a vacuum absorbing method and an adhesive method. To this end, the present invention provides a vacuum absorber comprising: a cover having a plurality of fixing pieces and a locking protrusion; a suction plate having a central shaft; and a height-adjusting member having an inner plate provided with a plurality of guide portions and an elastic locking piece, and a lateral plate, wherein a plurality of guide groove portions, into which the respective guide portions are inserted, and the locking protrusion sliding along the top of the respective guide portions are respectively protruded from the top of the inner side of the cover, a coupling groove portion is formed on the top of the suction plate, a coupling protrusion and a support portion having a shaft hole are formed on the inner plate of the height-adjusting member, and an adhesive member is attached to the bottom of the suction plate.

17 Claims, 6 Drawing Sheets

(58) Field of Classification Search
CPC ...... F16B 11/006; F16B 1/0071; F16B 2/185; F16B 1/0014; F16B 21/09; F16B 2/08; F16B 2/12; F16B 5/0692; F16B 5/126; F16B 7/10
USPC ......... 248/205.5, 205.6, 205.7, 205.8, 205.9, 248/206.1, 206.2, 206.3, 206.4
See application file for complete search history.

(56) References Cited

U.S. PATENT DOCUMENTS

| | | | |
|---|---|---|---|
| 8,356,781 B2* | 1/2013 | Chen | F16B 47/006 248/205.7 |
| 9,422,970 B1* | 8/2016 | Fan | F16B 47/00 |
| 2006/0027720 A1* | 2/2006 | Wu | F16B 47/00 248/205.5 |
| 2011/0226923 A1 | 9/2011 | Lin et al. | |

FOREIGN PATENT DOCUMENTS

| | | |
|---|---|---|
| KR | 1020110035205 A | 4/2011 |
| WO | 2011075934 A1 | 6/2011 |

* cited by examiner

VACUUM ABSORBER

CROSS-REFERENCE TO RELATED APPLICATIONS

This application is the U.S. National Phase under 35 U.S.C. §371 of International Application No. PCT/KR2013/002220 filed on Mar. 19, 2013, the disclosures of which are incorporated by reference into the present application.

TECHNICAL FIELD

The present invention relates to a vacuum absorber having a structure to hang washcloths, towels, tissues, etc., and in particular to a vacuum absorber wherein an enhanced assembling efficiency and smooth operation of each component of the vacuum absorber can be available, and the vacuum absorber can be firmly and easily attached to a smooth surface or a protruded surface by a vacuum absorbing method and an adhesive method.

BACKGROUND ART

In general, a vacuum absorber is a device which is able to be attached to the surface of a glass, a tile, etc. by a vacuum absorbing method in order to suspend or hang various type things, for example, washcloths, towels, tissue, etc.

The vacuum absorber is provided with a hanging member, and a suction plate. The handing member is configured to suspend or hang thereon washcloths, towels, tissue, etc. In a state where the suction plate is contacting with the surface (an attachment surface) of a glass, a tile, etc., the vacuum absorbed is pushed toward the attachment surface, thus deflating the air in a space between the attachment surface and the suction plate to the outside of the suction plate. Thereafter, a vacuum state can be made between the attachment surface and the suction plate. Since the suction plate is vacuum-absorbed on the attachment surface, the vacuum absorber can be fixedly installed.

The above vacuum absorber is hard to be sealed into a vacuum state between the suction plate and the attachment surface, and the absorbing force between the suction plate and the attachment surface is weak. For this reason, the suction plate may easily detach from the attachment surface, so the above vacuum absorber is hard to be fixedly installed for a long time on the attachment surface, and it needs to repeatedly attach the vacuum absorber whenever it detaches from the attachment surface, whereupon it is inconvenient to use the vacuum absorber.

To resolve the above-mentioned problems, the applicant of the present invention filed a vacuum absorber with the Korean patent publication number 10-2011-0035205. According to the above vacuum absorber, a height-adjusting member is moved to a suction plate in such a way to rotate the cover of the vacuum absorber in a state where the suction plate of the vacuum absorber is contacting with the attaching surface, so the outer circumferential surface of the suction plate is closely contacted with the attachment surface, and at the same time, the central portion of the suction plate is lifted up, thus forming the space between the attachment surface and the suction plate into a vacuum state. In this way, the absorbing force between the suction plate and the attachment surface can be enhanced, and for this reason, the vacuum absorber can be firmly, easily and fixedly installed on the attachment surface.

However, according to the above conventional vacuum absorber, the height-adjusting member and the suction plate of the vacuum absorber are assembled in a state where they are inserted into a plurality of engaging holes with the aid of engaging protrusions. Since the suction plate, to which the height-adjusting member is assembled, and the cover are engaged using only a plurality of rotation protrusions, the engaging protrusions may disengage from the engaging holes. For this phenomenon, the assembling force of each component may be weak, and the assembled components may shake or be movable, namely, they may not be firmly engaged, so a smooth operation cannot be obtained.

In addition, according to the above vacuum absorber, if the attachment surface is smooth, it may be possible to attach the vacuum absorber while maintaining a vacuum state between the attachment surface and the suction plate of the vacuum absorber. If the attachment surface, however, is rough or has protrusions, the space between the attachment surface and the suction plate may not become a vacuum state. For this reason, the vacuum absorber may not be attached to the attachment surface.

PRIOR ART TECHNOLOGY DOCUMENTS

Patent Documents

Patent document 1: The Korean patent publication number 10-2011-0035205 (Apr. 6, 2011)

DISCLOSURE OF INVENTION

Technical Problem

Accordingly, the present invention is made in an effort to resolve the above mentioned problems. It is an object of the present invention to provide a vacuum absorber wherein a structure providing a rotatable engagement to each component is added to each component of a vacuum absorber, for example, a cover, a height-adjusting member and a suction plate or is changed, so each component of the vacuum absorber can be firmly and easily engaged without any movements. For this reason, the assembling efficiency of the vacuum absorber can be enhanced, and a smooth component operation of the vacuum absorber can be obtained, whereupon the performance of the vacuum absorber can be enhanced.

In addition, according to the present invention, the adhesive member is engaged to the suction plate of the vacuum absorber, so the vacuum absorber can be used by the vacuum absorbing method with the aid of a suction plate as well as the adhesion method with the aid of an adhesive member. In this way, the vacuum absorber can be readily and easily attached to a predetermined attachment surface, for example, a smooth surface, a protruded surface, etc. Moreover, the vacuum absorber can keep being firmly attached for a long time to the attachment surface.

Technical Solution

To achieve the above objects, there is provided a vacuum absorber a vacuum absorber, which may include, but is not limited to, a cover which is installed rotatable on the top of the vacuum absorber and is formed of a plurality of fixing pieces formed on the inner upper surface thereof, and a plurality of locking protrusions; a suction plate which is installed below the cover and has a central shaft in the center of the upper surface; an inner plate which is installed between the cover and the suction plate and includes a plurality of guide portions formed of a slanted surface, a fixing groove portion and a stopper which are provided to rotate the cover within a predetermined range and stop the rotation, and a plurality of elastic locking pieces each of which has a predetermined elastic force, wherein each fixing piece slides against them so as to rotate or fix the cover; and a height-adjusting member which includes a lateral plate formed on an outer circumferential surface of the inner plate, wherein a plurality of guide groove portions into which the guide portions are inserted are formed on the inner upper surface of the cover, and an locking protrusion which is configured to slide along the upper surface of each guide portion is formed between the guide groove portions, and an coupling groove portions is formed in a circumferential direction of the suction plate on the upper surface of the suction plate, and a support portion having a shaft hole into which the central shaft is inserted is formed at the inner plate of the height-adjusting member, and a coupling protrusion which is inserted movable into the coupling groove portion is protruding from the lower surface of the inner plate, and an adhesive member which has a through hole to attach the suction plate to the attachment surface and is made of a soft material is attached to the lower surface of the suction plate.

Advantageous Effects

In the vacuum absorber formed of the cover, the rotation plate and the height-adjusting member according to the present invention, the locking protrusion, the guide groove portion and the insertion groove portion are formed at the cover. The coupling groove portion, the stepped portion and the inner protrusion portion are formed at the suction plate. The support portion having a shaft hole, the coupling protrusion inserted in the coupling groove portion and the inner side surface portion into which the inner side protrusion portion is inserted are formed at the height-adjusting portion. With the aid of the above configuration, the cover, the height-adjusting member and the suction plate can be firmly and easily engaged, thus enhancing the assembling efficiency of the vacuum absorber, and since the operations of the cover, the height-adjusting member and the suction plate can be smoothly carried out without any movements, the performance of the vacuum absorber can be enhanced.

In addition, since the adhesive member is engaged to the lower surface of the suction plate of the vacuum absorber, the vacuum absorbing method can be obtained with the aid of the suction plate while simultaneously carrying out the adhesion method with the aid of the adhesive member. For this reason, the vacuum absorber can be easily attached to a smooth attachment surface as well as a protruded attachment surface. Since the space between the suction plate and the attachment surface can be efficiently made into a vacuum state, the vacuum absorber can keep being firmly attached for a long time to the attachment.

MODES FOR CARRYING OUT THE INVENTION

The vacuum absorber according to the present invention will be described in detail with reference to FIGS. 1 to 8.

The vacuum absorber 100 according to the present invention may be configured to be attached by a vacuum absorbing method and an adhesion method, so it can be attached to a smooth surface (a), for example, a glass, a tile, etc. and a protruded surface (a) which is rough or has protrusions, so that various things, for example, washcloths, towels, tissue, etc. can be hung thereon.

As illustrated in FIGS. 1 to 4, the vacuum absorber 100 is configured in such a way that a cover 10 disposed on the top of the vacuum absorber 100 is installed rotatable, and a suction plate 30 which is vacuum-absorbed to, namely, is detachably attached to an attachment surface (a) is installed below the cover 10, and a height-adjusting member 20 is installed between the cover 10 and the suction plate 30 and is able to reciprocate in the rotation direction of the cover 10 so as to detachably attach the suction plate 30 to the attachment surface (a) in such a way to make into a vacuum state the space between the suction plate 30 and the attachment surface (a) or remove the vacuum state from the space by moving the suction plate 30.

Figure 1:
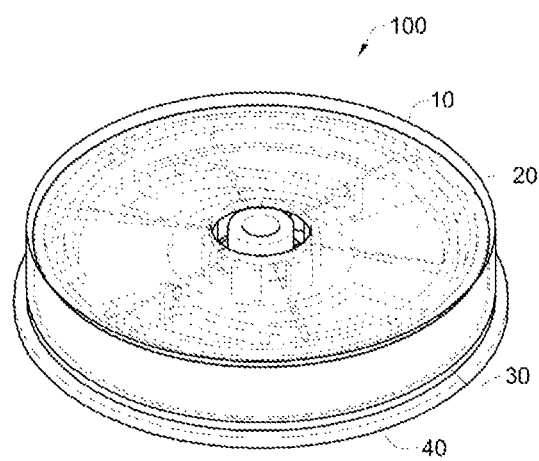
FIG. 1 is a perspective view illustrating a configuration of a vacuum absorber according to the present invention.
Figure 2:
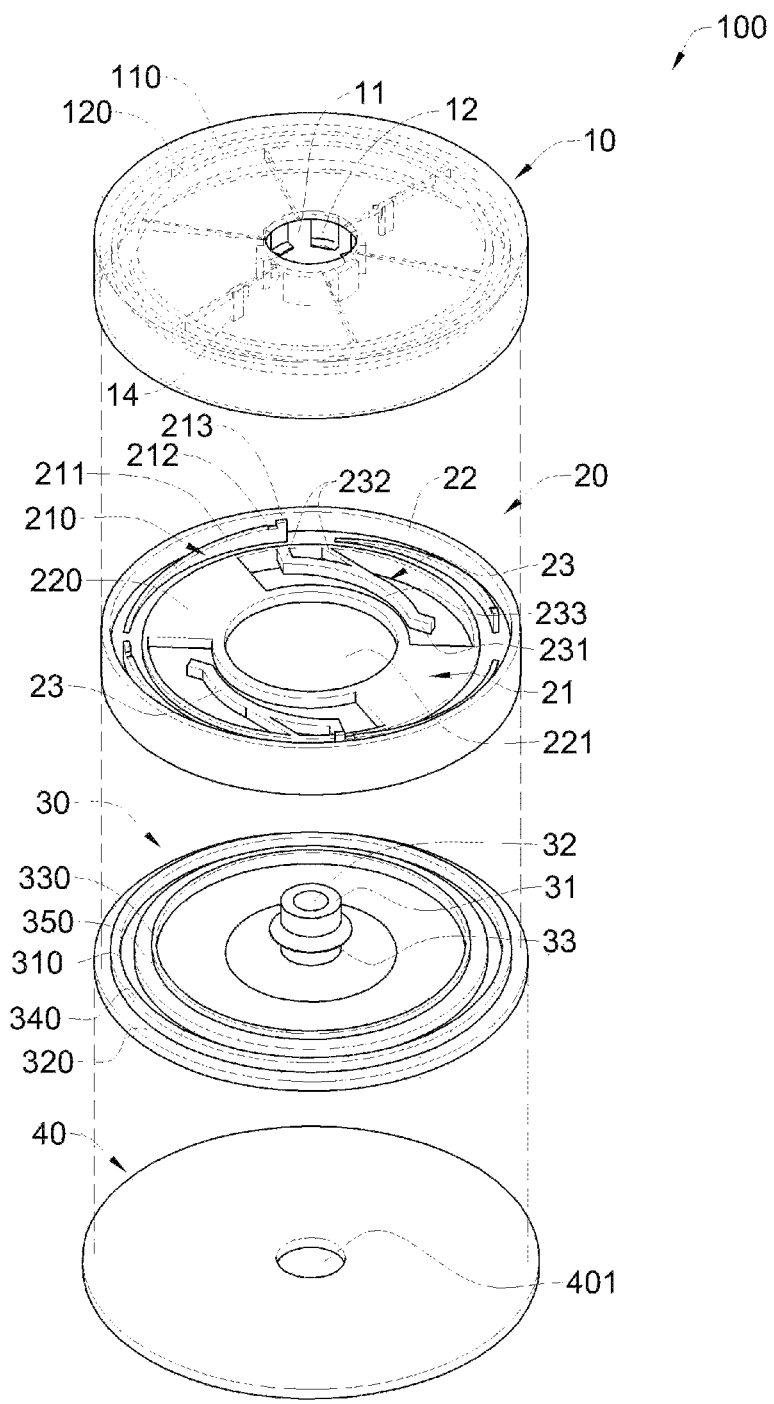
FIG. 2 is a separated perspective view illustrating a state where each component of a vacuum absorber according to the present invention is separated.
Figure 3:
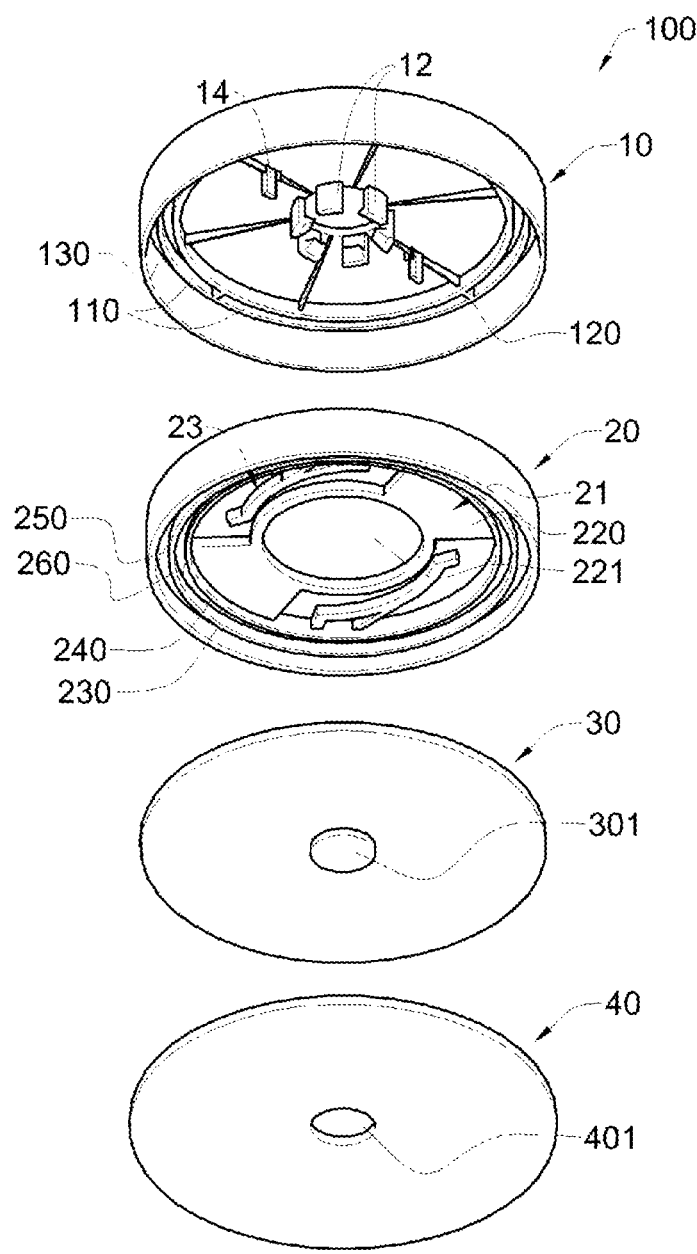
FIG. 3 is a bottom and separated perspective view illustrating each component of a vacuum absorber when viewing from their bottoms according to the present invention.
Figure 4:
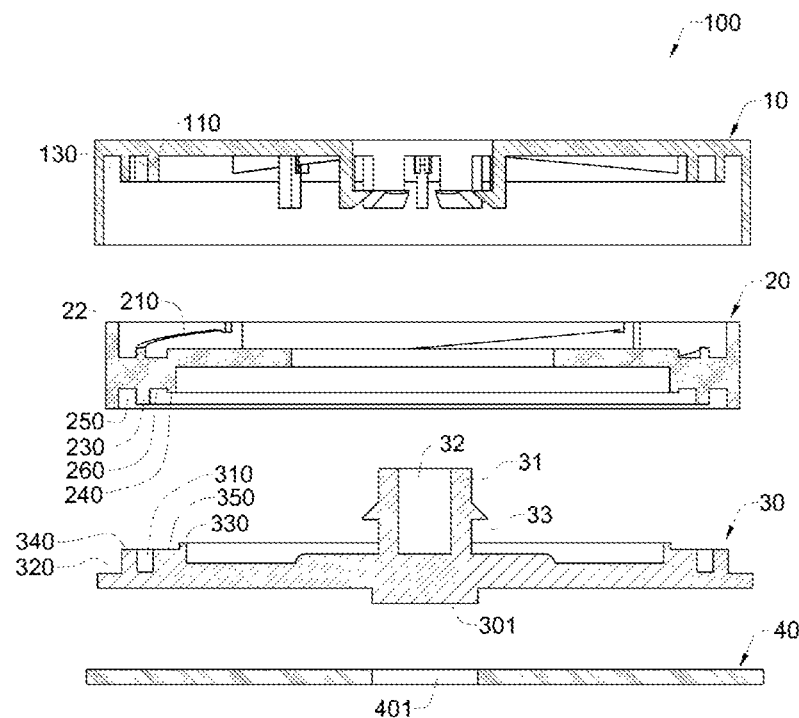
FIG. 4 is a separated cross sectional view illustrating a cross sectional state of each component of a vacuum absorber according to the present invention.
Figure 5:
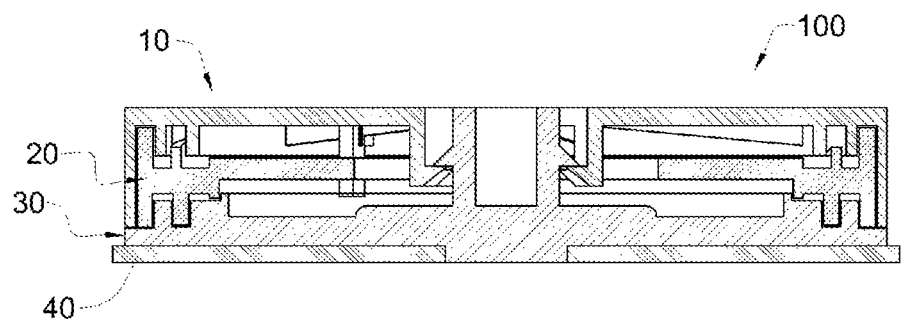
FIG. 5 is a cross sectional view illustrating a cross sectional state of a vacuum absorber according to the present invention.

As illustrated in FIGS. 2 to 4, the cover 10 may be configured in such a way that an insertion hole 11 into which one side of an engaging member (not illustrated) is inserted is formed passing through the center portion of the cover 10, and a plurality of rotation protrusions 12 are formed on the inner surface of the cover 10, which corresponds to an outer portion of the insertion hole 11, so as to connect and engage the cover 10 and the suction plate 30, and a plurality of fixing pieces 14 are provided on the inner upper surface of the cover 10 and are configured to slide along an elastic locking piece 23 of the height-adjusting member 20 by means of the rotating cover 10 and are formed in the shapes protruding in a downward direction of the cover 10 in order to prevent a return to the initial position of the cover 10 since it is hooked by an end of the elastic locking piece 23, namely, to prevent a reverse direction rotation thereof.

In addition, a plurality of guide groove portions 110 are formed on the inner upper surface of the cover 10 so as to guide the movement of the guide portion 210 wherein the guide portions 210 of the height-adjusting member 20 are inserted into the guide groove portions 110. A plurality of locking protrusions 120 are formed between the guide groove portions 110 so as to reciprocate the cover 10 and move the height-adjusting member 20 to the suction plate 30 while sliding along the upper surfaces of the guide portions 210 in a state where the locking protrusions 120 are contacting with the upper surfaces of the guide portions 210 which move inside the guide groove portions 110.

An insertion groove portion 130 is formed on the inner upper surface of the cover 10 which corresponds to an outer side portion of each guide groove portion 110 so as to guide the movement of the height-adjusting member 20, wherein the top of a lateral plate 22 of the height-adjusting member 20 is inserted into and engaged to the insertion groove portion 130.

Meanwhile, as illustrated in FIGS. 2 to 4, a central shaft 31 is installed on the upper surface of the central portion of the suction plate 30, wherein one side of a hanging member (not illustrated) is inserted into and engaged to the engaging hole 32, and an locking groove portion 33 is formed on an outer circumferential surface of the central shaft 31, wherein an end side of each fixing piece 14 of the cover 10 is fixedly inserted into the locking groove portion 33 in such a way that the cover 10 and the suction plate 30 can engaged rotatable.

An coupling groove portion 310 is formed on the upper surface of the suction plate 30 and in a circumferential direction of the suction plate 30, wherein a coupling protrusion 230 formed at the inner plate 21 of the height-adjusting member 20 is inserted movable in the coupling groove portion 310. A stepped portion 320 is formed at an outer side of the upper surface of the suction plate 30 which corresponds to an outer side of the coupling groove portion 310 in order to guide the movement of the height-adjusting member 20, wherein the lower portion of the lateral plate 22 of the height-adjusting member 20 is inserted and engaged. An inner side protrusion portion 330 is protruding from the upper surface of the suction plate 30 which corresponds to the inner side of the coupling groove portion 310, wherein the inner side protrusion portion 330 is inserted into an inner side surface portion 240 in a state where the inner side protrusion portion 330 is contacting with the inner surface of the inner side surface portion 240 formed at the inner plate 21 of the height-adjusting member 20.

A first surface portion 340 is formed between the coupling groove portion 310 and the stepped portion 320 of the suction plate 30, and a second surface portion 350 is formed between the coupling groove portion 310 and the inner side protrusion portion 330 of the suction plate 30.

In order to attach the vacuum absorber 100 to the attachment surface (a) which has protrusions, an adhesion material 40 is attached to the lower surface of the suction plate 30, wherein the adhesion member 40 is made of a soft material having a predetermined cushion is adhered to the lower surface of the suction plate 30 and is adhered to the attachment surface (a) which has protrusions. A formation protrusion portion 301 is protruding from the central portion of the lower surface of the suction plate 30. A through hole 401 is formed at a central portion of the adhesive member 40, wherein the formation protrusion portion 301 is inserted and positions and is able to make into a vacuum state the space between the suction plate 30 and the attachment surface (a).

The diameter of the adhesive member 40 may be same as the outer diameter of the suction plate 30 or may be a bit larger than the outer diameter thereof, and an adhesive material may be coated on both surfaces of the adhesive member 40 or the adhesive member 40 may be made of a predetermined material which is able to generate an adhesive substance, for example, polyurethane. The formation protrusion portion 301 and the through hole 401 may be formed in the same shape or may be formed in various shapes, for example, a circular shape, an elliptical shape, a polygonal shape, irregular shapes, etc.

Meanwhile, as illustrated in FIGS. 2 to 4, the height-adjusting member 20 may include an inner plate 21 which is provided at the inner side of the height-adjusting member 20. A lateral plate 22 which forms a rim portion of the height-adjusting member 20 is formed on an outer circumferential surface of the inner plate 21. The lateral plate 22 is formed perpendicular to the inner plate 21.

A plurality of elastic locking pieces 23 with predetermined elastic forces are formed at the inner plate 21 of the height-adjusting member 20 so as to allow the cover 10 to be rotatable and prevent the cover 10 from being fixed or rotating toward its initial position when the rotating cover 10 is placed at a predetermined position. As illustrated in FIG. 2, each elastic locking piece 23 may be configured in such a way that a bent surface 231 at which the fixing piece 14 of the cover 10 is hooked and fixed is formed on one surface of the elastic locking piece 23. An engaging surface 232 engaged to the inner surface of the inner plate 21 is formed on the other surface of the elastic locking piece 23. A curved surface 233 is formed between the bent surface 231 and the engaging surface 232, wherein the fixing piece 14 contacts slidable with the curved surface 233 when the elastic locking piece 23 is pressed by the fixing piece 14 of the rotating cover 10, and then the fixing piece 14 positions at the bent surface 231.

A plurality of guide portions 210 are formed on the upper surface of the inner plate 21 of the height-adjusting member 20 and are inserted in the guide groove portions 110 of the cover 10 in order for the cover 10 to rotate within a predetermined range and so as to stop the movement of the cover 10 and guide the movement of the cover 10.

Each guide portion 210 may include a slanted surface 211 which is slanted at a predetermined angle in order for the height-adjusting member 20 to push the suction plate 30 toward the attachment surface (a) or in the opposite direction of the attachment surface (a) based on the rotation direction of the cover 10 as each locking protrusion 120 of the cover 10 contacts and slides; a fixing groove portion 212 which is formed at an end of the slanted surface 211, wherein the locking protrusion 120 is inserted in the fixing groove portion 212 so as to stop the rotation of the cover 10; and a stopper 213 which is formed at one side of the fixing groove portion 212, wherein the locking protrusion 120 contacts with the stopper 213 in order for the cover 10 to rotate within a predetermined range.

A support portion 220 is formed at a central portion of the inner plate 21, wherein the support portion 220 is able to reinforce the strength of the height-adjusting member 20 and support the inner plate 21 in an effort to prevent any phenomenon where the height-adjusting member 20 is twisted or bent. A shaft hole 221 is formed at the support portion 220, wherein the central shaft 31 is inserted in and positions at the shaft hole 221 so that the fixing pieces 14 of the cover 10 can be engaged to the central shaft 31 of the suction plate 30.

A coupling protrusion 230 is formed on the lower surface of the inner plate 21, wherein the coupling protrusion 230 is inserted in the coupling groove portion 310 of the suction plate 30 in order for the height-adjusting member 20 to easily move and rotate against the suction plate 30. An inner side surface portion 240 is formed on the lower surface of the inner plate 21, wherein the inner side protrusion portion 330 of the suction plate 30 is inserted contacting with the inner surface thereof which corresponds to the inward direction of the coupling protrusion 230 in order for the height-adjusting member 20 and the suction plate 30 to be firmly and fixedly engaged without any movements.

A first groove portion 250 into which the first surface portion 340 of the suction plate 30 is inserted is formed between the inner surface of the lateral plate 22 of the height-adjusting member 30 and the coupling protrusion 230. A second groove portion 260 into which the second surface portion 350 of the suction plate 30 is inserted is formed between the coupling protrusion 230 of the height-adjusting member 30 and the inner side surface portion 240.

The cover 10, the height-adjusting member 20 and the suction plate 30 can be firmly and easily engaged and assembled without any separation and movement with the aid of the guide groove portion 110 into which the top of the lateral plate 22 is inserted, the stepped portion 320 into which the lower portion of the lateral plate 22 is inserted, and the coupling protrusion 230 and the coupling groove portion 310, the inner side surface portion 240 and the inner side protrusion portion 330, and the first and second groove portions 250 and 260, and the first and second surface portions 340 and 350.

According to the thusly constituted present invention, the vacuum absorber 100 having a handing member (not illustrated) to hang washcloths, towels, tissue, etc. can be attached by a vacuum absorbing method and an adhesion method to a smooth surface, for example, a glass, a tile, etc., a rough wall surface or a member (hereinafter, referred to as "attachment surface") like a tile having protrusions.

The top of the lateral plate 22 of the height-adjusting member 20 is inserted into the insertion groove portion 130 formed on the upper surface of the inner side of the cover 10 of the vacuum absorber 100, and the lower portion of the lateral plate 22 is inserted into the lateral plate 22 of the stepped portion 320 formed at an outer side portion of the upper surface of the suction plate 30. In the height-adjusting member 20, a plurality of guide portions 210 formed of the slanted surface 211, the fixing groove portion 212 and the stopper 213 are inserted into a plurality of the guide groove portions 110 formed on the upper surface of the inner side of the cover 10.

In addition, the coupling protrusion 230 formed on the lower surface of the inner plate 21 of the height-adjusting member 20 is inserted into the coupling groove portion 310 of the suction plate 30, and the inner side protrusion portion 330 of the suction plate 30 is inserted into the inner surface of the inner side surface portion 240 of the inner plate 21 in a state where it is contacting with the same. The first and second surface portions 340 and 350 of the suction plate 30 are inserted into the first and second groove portions 250 and 260 formed on the lower surface of the inner plate 21 of the height-adjusting member 20.

Each rotation protrusion portion 12 of the cover 10 is engaged hooked by the locking groove portion 33 formed on an outer circumferential surface of the central shaft 31 of the suction plate 30, and each fixing piece 14 of the cover 10 is contacting with the curved surface 233 of each elastic locking piece 23 of the height-adjusting member 20, and the locking protrusion 120 of the cover 10 is contacting with the upper surface of the slanted surface 211 of the guide portion 210 formed at the inner plate 21 of the height-adjusting member 20.

As above, the adhesive member 40 can be attached to the lower surface of the suction plate 30 in a state where the cover 10, the height-adjusting member 20 and the suction plate 30 are firmly engaged and assembled without any movements with the aid of each protrusion portion, groove portion and each component, thus manufacturing the vacuum absorber 100.

In this state, when it needs to attach the vacuum absorber 100 to a predetermined place or a predetermined portion, the vacuum absorber 100 is placed on the attachment surface (a) where a user wants to attach, and the user presses the vacuum absorber 100 toward the attachment surface (a), so the vacuum absorber 100 can be attached to the attachment surface (a) with the aid of the adhesive member 40.

Figure 7:
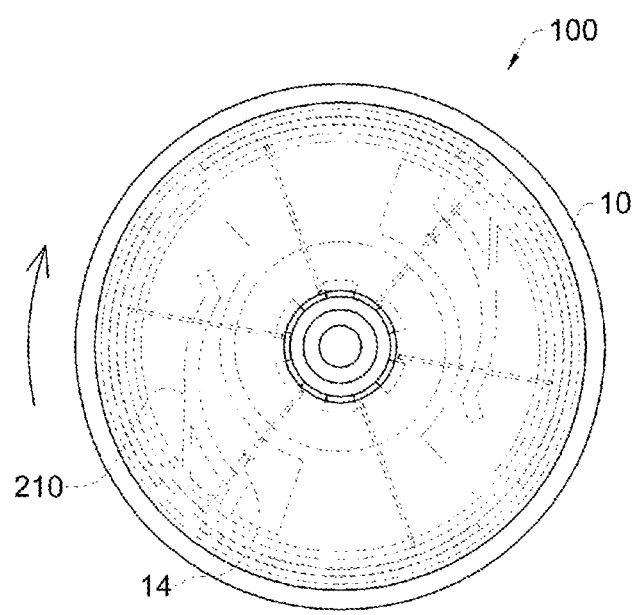
FIGS. 7 and 8 are plane views illustrating a state where a vacuum absorber according to the present invention is operating.
Figure 8:
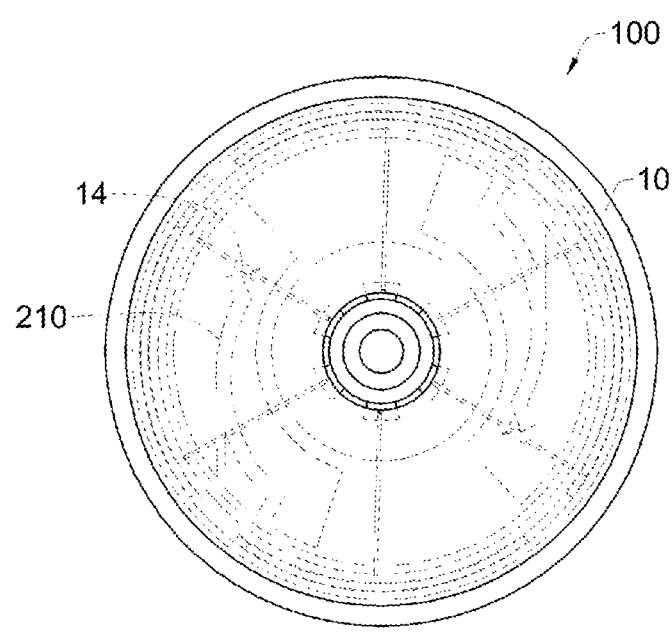

Thereafter, as illustrated in FIG. 7, when the user rotates the cover 10 of the vacuum absorber 100, the locking protrusion 120 of the cover 10 will slide along the slanted surface 211 of the guide portion 210 of the height-adjusting member 20. The sliding locking protrusion 120 is hooked by the stopper 213 of the guide unit 210, and when the end of the locking protrusion 120 is inserted into the fixing groove portion 212, the cover 10 no longer rotates and stops.

At the same time, each fixing piece 14 of the cover 10 will slide along the curved surface 233 of each elastic locking piece 23 (FIG. 7) and will position (FIG. 8) to be hooked by the bent surface 231 of each elastic locking piece 23, thus preventing the cover 10 from rotating so as to return to its initial position by the fixing piece 14 hooked by the bent surface 231.

As above, with the aid of each locking protrusion 120 which slides along the slanted surface 211 of the guide portion 210 by the rotation of the cover 10, the height-adjusting member 20 is able to press the outer circumferential surface of the suction plate 30, while moving toward the attachment surface (a).

Figure 6:
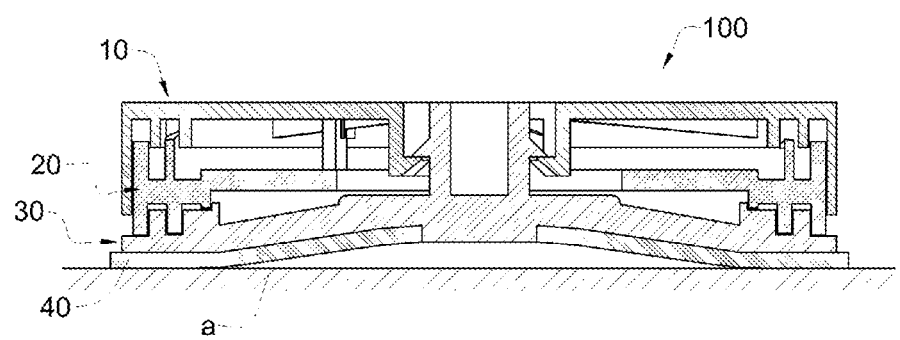
FIG. 6 is a cross sectional view illustrating a state where a vacuum absorber according to the present invention is attached to an attachment surface.

The outer circumferential surface of the lower surface of the suction plate 30 will press the outer circumferential surface of the adhesive member 40, thus enhancing the adhesion force between the adhesive member 40 and the attachment surface (a), and at the same time, the central portion of the lower surface of the suction plate 30 and the central portion which corresponds to the through hole 401 of the adhesive member 40 will be lifted up as illustrated in FIG. 6, so the space between the lower surface of the suction plate 30 and the attachment surface (a) can become a vacuum state.

For this reason, the vacuum absorber 100 can be firmly and closely attached to a smooth attachment surface (a), a rough attachment surface (a) which has protrusions, etc. by the vacuum absorbing method with the aid of the suction plate 30 and the adhesion method with the aid of the adhesive member 40.

Meanwhile, when it needs to separate the vacuum absorber 100 from the attachment surface (a), the user rotates the cover 10 in the direction opposite to when attaching the vacuum absorber 100 in order to separate each locking protrusion 120 from the fixing groove portion 212 of the guide portion 210, and at the same time, each fixing piece 14 is separated from the bent surface 231 of the elastic locking piece 23, whereupon each fixing piece 14 is able to automatically return to its initial position with the aid of elastic force of the elastic locking piece 23, namely, the initial position which corresponds to the initial point where it is first assembled.

Since the central portion between the suction plate 30 and the adhesive member 40 moves toward the attachment surface (a), the vacuum formed between the suction plate 30 and the attachment surface (a) is removed, so the vacuum absorber 100 can position at a portion illustrated in FIG. 4. In this state, the user can separate the vacuum absorber 100 by separating the adhesive member 40 attached to the attachment surface (a).

Each component of the vacuum absorber 100 can be easily and firmly engaged without any movements since the guide groove portion 110, the locking protrusion 120, the insertion groove portion 130, etc. are formed at the cover 10 of the vacuum absorber 100, and the support portion 220 having the guide portion 210 and the shaft hole 221, the coupling protrusion 230, the inner side surface portion 240, etc. are provided at the height-adjusting member 20, and the coupling groove portion 310, the stepped portion 320, the inner side protrusion portion 330, etc. are provided at the suction plate 30. In this way, the assembling efficiency of the vacuum absorber 10 and the operation between the components can be enhanced. The vacuum absorber 100 can be easily and firmly attached to a smooth attachment (a), an attachment surface (a) having protrusions, or the like by the vacuum absorbing method and the adhesion method with the aid of the suction plate 30 and the adhesive member 40 of the vacuum absorber 100. For this reason, the present invention may become a very useful invention to the real life.

As above, the vacuum absorber according to the present invention has been described with reference to the accompanying drawings. The present invention is not limited by the embodiments and drawings disclosed in the present invention and can be modified into various forms by a person having ordinary skill in the art within a technical range of the present invention, and the present invention should not be interpreted separately from the technical concepts and prospects of the present invention.

| Legend of Reference Numbers | |
| --- | --- |
| 10: Cover | 11: Insertion hole |
| 12: Rotation protrusion | 14: Fixing piece |
| 20: Height-adjusting member | 21: Lower plate |
| 22: Lateral plate | 23: Elastic locking piece |
| 30: Suction plate | 31: Central shaft |
| 32: Coupling groove | 33: Coupling groove portion |
| 40: Adhesive member | 110: Guide groove portion |
| 120: Locking protrusion | 130: Insertion groove portion |
| 210: Guide portion | 211: Slanted surface |
| 212: Fixing groove portion | 213: Stopper |
| 220: Support portion | 221: Shaft hole |
| 230: Coupling protrusion | 231: Bent surface |
| 232: Engaging surface | 233: Curved surface |
| 240: Inner side surface portion | 250, 260: First and second groove portions |
| 301: Formation protrusion portion | 310: Coupling groove portion |
| 320: Stepped portion | 330: Inner side protrusion portion |
| 340, 350: First and second surface portions | 401: Through hole |
| a: Attachment surface | |

The invention claimed is:

1. A vacuum absorber, comprising:
a cover which is installed rotatable;
a suction plate which is engaged to the cover and is installed absorbed on an attachment surface; and
a height-adjusting member which is installed between the cover and the suction plate and is able to form a vacuum state between the suction plate and the attachment surface based on the rotation of the cover,
wherein the cover includes, at an inner upper surface, a guide groove portion wherein locking protrusions are formed at intervals in the shape of a partition, and an insertion groove portion which is formed at an outer portion of the guide groove portion, and the suction plate includes, at an upper surface thereof, a stepped portion on which a side wall of the cover is mounted, and a coupling groove portion which is formed at an inner portion of the stepped portion, and
the height-adjusting member is formed of an inner plate, and a side plate formed covering the inner plate, and a top of the side plate is inserted movable along the insertion groove portion, and a guide portion is formed at an upper surface of the inner plate, wherein the locking protrusions inserted in the guide groove portion move along an upper slanted surface as the cover rotates, and a coupling protrusion inserted movable along the engaging groove portion are provided at a lower surface of the inner plate, and a flexible adhesive member is provided integral at a lower surface of the suction plate.

2. The absorber of claim 1, wherein the suction plate includes a formation protrusion portion which is formed protruding from a central portion of the lower surface thereof, and the adhesive member is formed in a plate shape having a predetermined size large enough to cover the lower surface of the suction plate and includes a through hole having a predetermined size and shape in order for the formation protrusion portion to pass through and to be shrink-fitted.

3. The absorber of claim 1, wherein the height-adjusting member includes, at the lower surface of the inner plate, a first groove portion which has a predetermined depth toward an outer side of the coupling protrusion, and the suction plate includes, at the upper surface thereof, a first surface portion having a predetermined size and shape so as to be inserted in the first groove portion.

4. The absorber of claim 3, wherein the height-adjusting member includes a second groove portion at an inner portion of the coupling protrusion, and the suction plate includes a second surface portion which is inserted and positions in the second groove portion when a vacuum state is made as the cover rotates, and an inner side protrusion portion which is formed protruding from an inner side end portion of the second surface portion.

5. The absorber of claim 4, wherein the second groove portion of the height-adjusting member is formed on the same line as the depth surface of the first groove portion.

6. The absorber of claim 1, wherein the cover includes: an insertion hole in which an end portion of a hanging member is inserted, wherein the handing member is configured to hang or hook a thing; a plurality of rotation protrusions which are formed protruding in a radial direction from the inner upper surface wherein insertion holes are formed and have bent hooks; and a plurality of fixing pieces which are formed protruding downward toward an outer side of the rotation protrusions.

7. The absorber of claim 6, wherein the cover includes, at inner upper surface, a plurality of reinforcing ribs which are formed protruding with predetermined lengths in the direction of a side wall from the insertion hole and are disposed in a radial shape.

8. The absorber of claim 6, wherein the height-adjusting member includes, at the inner plate, a plurality of elastic locking pieces which allow the fixing pieces to slide, and the guide portion includes a fixing groove portion and a stopper at the end portion thereof, by means of which the end portion of the locking protrusion of the cover can be hooked and fixed in place.

9. The absorber of claim 8, wherein the elastic locking piece includes: one or a plurality of engaging surfaces which are connected integral to the height-adjusting member; a bent surface which is formed for the fixing piece to be hooked fixed in place by one surface which is a free end state; and a curved surface which is formed curved at a predetermined angle for the fixing piece to slide in a contacting state between an engaging surface and the bent surface.

10. The absorber of claim 1, wherein both sides of the adhesive member are coated with an adhesive substance.

11. A vacuum absorber, comprising:
a cover which is installed rotatable on a top of the vacuum absorber and is formed of a plurality of fixing pieces formed on an inner upper surface thereof, and a plurality of locking protrusions;
a suction plate which is installed below the cover and has a central shaft in a center of the upper surface;
an inner plate which is installed between the cover and the suction plate and includes a plurality of guide portions formed of a slanted surface, a fixing groove portion and a stopper which are provided to rotate the cover within a predetermined range and stop the rotation, and a plurality of elastic locking pieces each of which has a predetermined elastic force, wherein each fixing piece slides against them so as to rotate or fix the cover; and
a height-adjusting member which includes a lateral plate formed on an outer circumferential surface of the inner plate,
wherein a plurality of guide groove portions into which the guide portions are inserted are formed on the inner upper surface of the cover, and an locking protrusion which is configured to slide along an upper surface of each guide portion is formed between the guide groove portions, and a coupling groove portions is formed in a circumferential direction of the suction plate on an upper surface of the suction plate, and a support portion having a shaft hole into which the central shaft is inserted is formed at an inner plate of the height-adjusting member, and a coupling protrusion which is inserted movable into the coupling groove portion is protruding from a lower surface of the inner plate, and an adhesive member which has a through hole to attach the suction plate to the attachment surface and is made of a soft material is attached to a lower surface of the suction plate.

12. The absorber of claim 11, wherein an insertion groove portion is formed on the inner upper surface of the cover wherein a top of the lateral plate of the height-adjusting member is inserted and engaged into the insertion groove portion, and a stepped portion is formed at an outer side portion of the upper surface of the suction plate in order to position on a lower inner surface of the lateral plate of the height-adjusting member.

13. The absorber of any of claim 12, wherein a surface portion formed between the coupling groove portion of the suction plate and the stepped portion is inserted into a groove portion formed between the inner surface of the lateral plate of the height-adjusting portion and the coupling protrusion, and a surface portion formed between the coupling groove portion of the suction plate and the inner side protrusion portion is inserted into a groove portion formed between the coupling protrusion of the height-adjusting member and an inner side surface portion.

14. The absorber of claim 11, wherein an inner side protrusion portion is protruding from the upper surface of the suction plate, and an inner side surface portion is formed on the lower surface of the inner plate of the height-adjusting member in such a way that the inner side protrusion portion can be inserted in a contacting state.

15. The absorber of any of claim 14, wherein a surface portion formed between the coupling groove portion of the suction plate and the stepped portion is inserted into a groove portion formed between the inner surface of the lateral plate of the height-adjusting portion and the coupling protrusion, and a surface portion formed between the coupling groove portion of the suction plate and the inner side protrusion portion is inserted into a groove portion formed between the coupling protrusion of the height-adjusting member and the inner side surface portion.

16. The absorber of any of claim 11, wherein a surface portion formed between the coupling groove portion of the suction plate and the stepped portion is inserted into a groove portion formed between the inner surface of the lateral plate of the height-adjusting portion and the coupling protrusion, and a surface portion formed between the coupling groove portion of the suction plate and the inner side protrusion portion is inserted into a groove portion formed between the coupling protrusion of the height-adjusting member and the inner side surface portion.

17. The absorber of claim 11, wherein a formation protrusion portion is formed at a central portion of the lower surface of the suction plate in order to make into a vacuum state a space formed between the suction plate, and the attachment surface, the suction plate is inserted into the through hole of the adhesive member and attached to the attachment surface, the suction plate together with the through hole.

\* \* \* \* \*